United States Patent [19]

Nagano et al.

[11] Patent Number: 4,490,508

[45] Date of Patent: Dec. 25, 1984

[54] GRAFT-MODIFIED COPOLYMER AND COMPOUNDING AGENT FOR STYRENE-TYPE POLYMER CONTAINING THE SAME

[75] Inventors: Riichiro Nagano, Hiroshima; Toshihiro Sagane, Yamaguchi, both of Japan

[73] Assignee: Mitsui Petrochemical Industries, Ltd., Tokyo, Japan

[21] Appl. No.: 480,349

[22] Filed: Mar. 30, 1983

[30] Foreign Application Priority Data

Mar. 30, 1982 [JP] Japan ................................. 57-50136

[51] Int. Cl.$^3$ .................... C08F 255/04; C08F 255/06
[52] U.S. Cl. ...................................... 525/316; 525/75; 525/70; 525/86; 525/87; 525/290; 525/322; 525/324
[58] Field of Search ................ 525/322, 324, 290, 316

[56] References Cited

U.S. PATENT DOCUMENTS

| | | | |
|---|---|---|---|
| 3,489,821 | 1/1970 | Witt et al. | 525/290 |
| 3,849,518 | 11/1974 | Severini et al. | 525/290 |
| 4,054,615 | 10/1977 | Hardt et al. | 525/290 |

*Primary Examiner*—Wilbert J. Briggs, Sr.
*Attorney, Agent, or Firm*—Armstrong, Nikaido, Marmelstein & Kubovcik

[57] ABSTRACT

A graft-modified copolymer having a melt flow rate of 0.01 to 100 g/10 min at a temperature of 230° C. under a load of 2160 g. The graft-modified copolymer is prepared by grafting (a) 100 parts by weight of low crystalline or amorphous ethylene-alpha-olefin copolymer having an ethylene content of 40 to 93 mole%, a melt flow rate of 0.1 to 50 g/10 min at a temperature of 230° C. under a load of 2160 g, and a density of 0.90 g/cm$^3$ or less with (b) 0.3 to 50 parts by weight of a styrene-type hydrocarbon. This graft-modified copolymer is suitable for use as a compounding agent for improving the impact resistance of styrene-type polymers without decreasing the surface hardness, weathering resistance, and molding properties thereof.

6 Claims, No Drawings

GRAFT-MODIFIED COPOLYMER AND COMPOUNDING AGENT FOR STYRENE-TYPE POLYMER CONTAINING THE SAME

BACKGROUND OF THE INVENTION

1. Field of the Invention

The present invention relates to a graft-modified copolymer and, more specifically, it relates to a graft-modified copolymer derived from the graft modification of low crystalline or amorphous ethylene-alpha-olefin copolymer having specified properties with a styrene-type hydrocarbon. This graft-modified copolymer is suitable for use as a compounding agent for improving the impact resistance of styrene-type polymers without decreasing the surface hardness, weathering resistance, and molding properties thereof.

2. Description of the Prior Art

Heretofore, various methods for obtaining polystyrene and other styrene-type polymers having improved impact resistance by compounding rubber-like elastomer into general-purpose (GP) polystyrene and other similar resins having high stiffness are known. It has also been proposed that a rubber-like elastomer graft-modified with a styrene-type hydrocarbon is compounded to improve the compatibility between a polystyrene phase and a rubber phase. For example, high-impact (HI) polystyrenes, ABS resins and other styrene-type resins having appropriate stiffness and impact resistance are widely utilized in various application fields after treating with the above-mentioned modification methods. However, the resultant resin compositions have a disadvantage that the weathering properties are poor because polybutadiene and other diene type rubbers are used as a rubber-like polymer compounding agent for providing impact resistance to styrene-type polymers in the conventional methods. For example, these resin compositions are limitedly utilized for outdoor use because they are subjected to extreme ultraviolet degradation and ozone degradation. This is a largest disadvantage of HI polystyrenes, ABS resins and other styrene-type resins.

Recently, various attempts to improve impact resistance of styrene-type polymer compositions without decreasing the weathering resistance, surface hardness, and molding properties have been made. For example, various methods in which rubber-like elastomers graft-modified with styrene-type hydrocarbons and having no carbon-carbon double bond in the polymer molecule are used as a compounding agent in lieu of the above-mentioned diene-type rubber-like elastomers graft-modified with styrene-type hydrocarbons have been proposed. Examples of such compounding agents are acrylic acid ester type rubbers, ethylene-vinyl acetate copolymers, and chlorinated polyethylenes. The weathering properties of the styrene-type resin compositions containing the above-mentioned compounded rubber-like elastomers are improved. However, these styrene-type resin compositions have the disadvantages of poor thermal properties such as poor low-temperature characteristics and poor heat aging resistance. Therefore, the application fields thereof are limited.

Furthermore, it has been proposed that styrene is polymerized in the presence of the above-mentioned rubber-like elastomers to disperse the rubber-like elastomers in styrene-type polymers. According to this method, two different reactions of a graft reaction of styrene onto the rubber-like elastomer and a homopolymerization of styrene simultaneously proceed to produce a styrene-type polymer composition containing the above-mentioned rubber-like elastomer compounded therewith. However, it is difficult to obtain a resin composition having excellent impact strength and excellent weathering resistance and molding properties in this method since it is difficult to control both reactions for the optimum physical properties of the resultant resin composition become.

SUMMARY OF THE INVENTION

Accordingly, the objects of the present invention are to eliminate the above-mentioned disadvantages of the prior art and to provide a graft modified copolymer suitable for use as a compounding agent for improving the impact resistance of styrene-type polymers without decreasing the surface hardness, weathering resistance, and molding properties thereof.

Another object of the present invention is to provide a compounding agent for a styrene-type polymer capable of improving the impact resistance thereof without decreasing the surface hardness, weathering resistance, and molding properties thereof.

Other objects and advantages of the present invention will be apparent from the following description.

In accordance with the present invention, there is provided a graft-modified copolymer having a melt flow rate of 0.01 to 100 g/10 min at a temperature of 230° C. under a load of 2160 g. The graft-modified copolymer is prepared by grafting (a) 100 parts by weight of low crystalline or amorphous ethylene-alpha-olefin copolymer having an ethylene content of 40 to 93 mole%, a melt flow rate of 0.1 to 50 g/10 min at a temperature of 230° C. under a load of 2160 g, and a density of 0.90 g/cm$^3$ or less with (b) 0.3 to 50 parts by weight of a styrene-type hydrocarbon.

In accordance with the present invention, there is also provided a compounding agent for a styrene-type polymer comprising a graft-modified copolymer having a melt flow rate of 0.01 to 100 g/10 min at a temperature of 230° C. under a load of 2160 g. The graft-modified copolymer is prepared by grafting (a) 100 parts by weight of low crystalline or amorphous ethylene-alpha-olefin copolymer having an ethylene content of 40 to 93 mole%, a melt flow rate of 0.1 to 50 g/10 min at a temperature of 230° C. under a load of 2160 g, and a density of 0.90 g/cm$^3$ or less with (b) 0.3 to 50 parts by weight of a styrene-type hydrocarbon.

DESCRIPTION OF THE PREFERRED EMBODIMENTS

The graft-modified copolymers according to the present invention can be prepared by graft copolymerizing low crystalline or amorphous ethylene-alpha-olefin copolymers having the specified properties with the specified amount of styrene-type hydrocarbons. The ethylene-alpha-olefin copolymers to be graft modified must have an ethylene content of 40 to 93 mole%, desirably 60 to 85 mole%. Ethylene-alpha-olefin copolymers having an ethylene content of more than 93 mole% or less than 40% are high crystalline copolymers. The graft-modified copolymers obtained from graft copolymerization of such high crystalline copolymers with styrene-type hydrocarbons cannot sufficiently improve the impact resistance of styrene-type polymers when they are compounded into the styrene-type polymers.

The ethylene-alpha-olefin copolymers to be graft-modified must also have a melt flow rate (MFR) of 0.1 to 50 g/10 min, desirably 0.5 to 10 g/10 min, at a temperature of 230° C. under a load of 2160 g according to an ASTM-D-1238E method. Ethylene-alpha-olefin copolymers having an MFR of less than 0.1 g/10 min or more than 50 g/10 min graft-modified with styrene-type hydrocarbons cannot improve the impact resistance of styrene-type polymers when compounded into the styrene-type polymers. This is because the graft-modified products of the ethylene-alpha-olefin copolymers having an MFR of less than 0.1 g/10 min or more than 50 g/10 min have extremely different viscosities from those of the styrene-type polymers and, therefore, the graft-modified products cannot be sufficiently dispersed in the styrene-type polymers.

The ethylene-alpha-olefin copolymers to be graft-modified must further have a density of 0.90 g/cm$^3$ or less, desirably a density of 0.86 to 0.89 g/cm$^3$. The ethylene-alpha-olefin copolymers having a density of more than 0.90 g/cm$^3$ cannot improve the impact resistance of styrene-type polymers. As is mentioned above, the ethylene-alpha-olefin copolymers must be low crystalline or amorphous. The crystallinity indexes of the ethylene-alpha-olefin copolymers are generally 0 to 50%, desirably 0 to 30%.

Alpha-olefins usable as an alpha-olefin component in the ethylene-alpha-olefin copolymers are those having 3 to 20 carbon atoms, desirably 3 to 10 carbon atoms. Examples of such alpha-olefins are propylene, 1-butene, 1-hexene, 4-methyl-1-pentene, and 1-decene. These alpha-olefins can be used alone or any mixture thereof. Desirable alpha-olefins are propylene and 1-butene. The ethylene-alpha-olefin copolymers to be graft-modified with styrene-type hydrocarbons can optionally contain, as a third component, a minor amount, e.g., 15 mole% or less, based on the total amount thereof, of a diene monomer. Examples of such diene monomers are butadiene, isoprene, piperilene, 1,4-hexadiene, 1,5-hexadiene, 1,7-octadiene, dicyclopentadiene, 5-ethylidene-2-norbornene, 5-vinyl-2-norbornene, 5-methylene-2-norbornene, and 2,5-norbornadiene.

The styrene-type hydrocarbons usable as a grafting component for preparing the graft-modified ethylene-alpha-olefin copolymers are those having the following general formula (I):

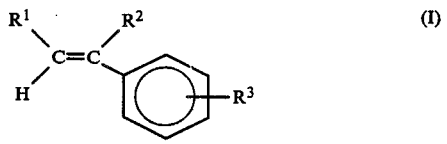

wherein R$^1$, R$^2$, R$^3$ are independently a hydrogen atom or lower alkyl groups having 1 to 5 carbon atoms. Typical examples of such styrene-type hydrocarbons are styrene, alpha-methylstyrene, o-methylstyrene, m-methylstyrene, p-methylstyrene, m-ethylstyrene, p-ethylstyrene, o-isopropylstyrene, m-isopropylstyrene, and p-isopropylstyrene. Of these styrene-type hydrocarbons, styrene, m-, or p-methylstyrene is desirable.

The graft ratio of the styrene-type hydrocarbons to the ethylene-alpha-olefin copolymers must be 0.3 to 50 parts by weight, desirably 1 to 20 parts by weight, based on 100 parts by weight of the ethylene-alpha-olefin copolymers. A graft ratio of the styrene-type hydrocarbons of less than 0.3 parts by weight based on 100 parts by weight of the copolymers results in a remarkable decrease in the compatibility of the graft-modified copolymers to the styrene-type-polymers and, therefore, naturally causes delamination of the graft-modified copolymers and decreases the improvement in the impact resistance. Contrary to this, a graft ratio of more than 50 parts by weight reduces the rubber-like elasticity of the resultant graft-modified ethylene-alpha-olefin copolymers and, therefore, results in a decrease in the improvement in the impact strength of the styrene-type polymers.

The graft-modified ethylene-alpha-olefin copolymers according to the present invention generally have an MFR of 0.01 to 100 g/10 min, desirably 0.01 to 20 g/10 min and most desirably 0.05 to 10 g/10 min, measured at a temperature of 230° C. under a load of 2160 g according to an ASTM-D-1238E method.

The graft-modified ethylene-alpha-olefin copolymers according to the present invention can be prepared by graft copolymerizing the ethylene-alpha-olefin copolymers with the styrene-type hydrocarbons in any conventional manner. For example, the graft copolymerization can be carried out by so-called direct molten methods or solution method. According to the direct molten methods, the graft copolymerization of the ethylene-alpha-olefin copolymers with the styrene-type hydrocarbons can be advantageously carried out in a molten state in the presence of, or in the absence of, a radical initiator by using a reactor such as an extruder.

Examples of the radical initiators usable in the graft copolymerization are organic peroxides, organic peresters, and azo compounds. Typical examples of the radical initiators are benzoyl peroxide, dichlorobenzoyl peroxide, dicumyl peroxide, di-tert-butyl peroxide, 2,5-dimethyl-2,5-di(peroxide benzoate)hexyne-3, 1,4-bis(-tert-butyl-peroxoisopropyl)benzene, lauroyl peroxide, tert-butyl peracetate, 2,5-dimethyl-2,5-di(tert-butyl-peroxy)hexyne-3, 2,5-dimethyl-2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate, tert-butyl perdiethyl acetate, azobisisobutyronitrile, and dimethylazoisobutylate. Desirable radical initiators are dialkyl peroxides such as dicumyl peroxide, di-tert-butyl peroxide, 2,5-dimethyl-2,5-di(tert-butylperoxy)-hexyne-3, 2,5-dimethyl-2,5-di(tert-butylperoxy)hexane, and 1,4-bis(tert-butylperoxy isopropyl) benzene.

The graft copolymerization of the ethylene-alpha-olefin copolymers with the styrene-type hydrocarbons in a molten state is generally carried out at a temperature of 60° C. to 350° C., desirably 80° C. to 300° C. under an inert gas atmosphere for 1 to 1000 minutes. The amount of the styrene-type hydrocarbons is generally 0.5 to 200 parts by weight based on 100 parts by weight of the ethylene-alpha-olefin copolymers, depending upon the desired properties of the graft-modified copolymers and the graft copolymerization conditions. The amount of the radical initiators used in the graft copolymerization is generally 0.001 to 5, desirably 0.01 to 2, based on 100 parts by weight of the ethylene-alpha-olefin copolymers depending upon the desired properties of the graft-modified copolymers and the graft copolymerization conditions.

The graft copolymerization in a molten state is generally carried out by using, for example, an extruder in a continuous manner. Desirable extruders are those provided with a single or dual (or twin) type screw suitable for use in uniform mixing or blending of the starting materials. Batchwise type mixers or blenders such as an intensive mixer can also be used in the graft copolymerization under a molten state. The resultant graft-modified products can be recovered by any known manner, for example, by removing the unreacted styrene-type hydrocarbons and the radical initiators and their degradation products from the resultant products. The removal of the unreacted hydrocarbons and the initiators and their degradation products can be carried out by treating the resultant products in appropriate solvents such as acetone, methyl ethyl ketone, methyl isobutyl ketone, dioxane, methyl alcohol, ethyl alcohol, isopropyl alcohol, acetates, chloroform, benzene, and other aromatic solvents, followed by precipitation, or by evacuating the system in vacuo after the extrusion.

On the other hand, the graft copolymerization of the ethylene-alpha-olefin copolymers with the styrene-type hydrocarbons can also be advantageously carried out in a solvent solution, or an aqueous dispersion in the presence, or in the absence, of the radical initiators exemplified above.

Examples of the solvents usable in the graft copolymerization are alkylaromatic hydrocarbons such as toluene, xylene, ethylbenzene, cumene, and trimethylbenzene; aliphatic hydrocarbons such as pentanes, hexanes, and heptanes; and halogenated hydrocarbons such as 1-chloropentane, trichlorohexane, chlorobenzene, dichlorobenzene, and p-chlorotoluene.

Graft copolymerization in a solution can be carried out in various manners. Generally speaking, the ethylene-alpha-olefin copolymers are first dissolved in alkylaromatic hydrocarbon solvents and, then, the styrene-type hydrocarbons and the radical initiators are added thereto. The addition of the styrene-type hydrocarbons and the addition of radical initiators can be independently effected all at once, or can be effected continuously or batchwise in limited amounts. However, the addition of both components in limited amounts is desirable. The graft copolymerization is generally carried out at a temperature of 60° C. to 250° C. under a pressure of 0 to 50 kg/cm$^2$ for 10 to 1000 minutes. The amount of the styrene-type hydrocarbons is generally 0.5 to 1000 parts by weight based on 100 parts by weight of the ethylene-alpha-olefin copolymers, depending upon the desired properties of the graft-modified copolymers and the graft copolymerization conditions. The amount of the radical initiators used in the graft copolymerization is generally 0.01 to 50, desirably 0.1 to 10, based on 100 parts by weight of the ethylene-olefin copolymers, depending upon the desired properties of the graft-modified copolymers and the graft copolymerization conditions.

The resultant graft-modified products can be recovered by any known manner, for example, by charging the resultant reaction products into a large amount of solvents such as methyl ethyl ketone to precipitate the desired graft-modified products. The precipitated graft-modified products can be purified by washing the same with non-solvents.

The graft-modified copolymers of the present invention can be advantageously used as a compounding agent for improving impact resistance of styrene-type polymers. The term "styrene-type polymers" used herein means polymers and copolymers containing at least 30 mole% of styrene-type hydrocarbon unit. Examples of such styrene-type polymers are GP-polystyrene, HI-polystyrene, poly-alpha-methylstyrene, styrene-acrylonitrile copolymer (AS), and styrene-acrylonitrile-butadiene copolymer (ABS). Of these styrene-type polymers, the impact resistances of GP-polystyrene and HI-polystyrene are desirably improved by compounding the graft-modified copolymers of the present invention as a compounding agent for improving the impact resistance into those polystyrenes. The graft-modified copolymers of the present invention can be used, as the compounding agent, alone or in a combination thereof with other rubber-like elastomers. However, the use of the graft modified copolymers of the present invention alone is desirable in view of the compatibility thereof with the styrene-type polymers.

The amount of the graft-modified ethylene-alpha-olefin copolymers of the present invention used as the compounding agent is generally 2 to 35 parts by weight, desirably 5 to 18 parts by weight, based on 100 parts by weight of the styrene-type polymers. The blending of the styrene-type polymers with the graft-modified ethylene-alpha-olefin copolymers can be carried out by using any conventional blending or mixing methods. For instance, the blending can be carried out by mixing the styrene-type polymers with the graft-modified ethylene-alpha-olefin copolymers in a Henschel mixer, a V-blender, a ribbon blender, or other mixers or blender, followed by the knead pelletizing of the blend in an extruder. Alternatively, the blending can be carried out by melt kneading the styrene-type polymers and the graft-modified ethylene-alpha-olefin copolymers in a Banbury mixer, a single or multiple screw extruder, or a kneader, followed by pelletizing or grinding.

The styrene-type polymers can contain other additives such as antistatic agents, weathering agents, antioxidants, plasticizers, lubricants, and flame retardants; dyes; pigments; glass fibers; carbon blacks; inorganic substances such as carcium carbonates; and polymers such as SBR, NBR, and styrene-maleic acid copolymer, as long as the object of the present invention is not impaired.

The present compounding agents for the styrene-type polymers comprising the ethylene-alpha-olefin copolymers grafted with the styrene-type hydrocarbons have improved compatibility with the styrene-type polymers, as compared with the non-grafted ethylene-alpha-olefin copolymers, due to the grafting of the styrene-type hydrocarbons. As a result, the adhesion properties at the interface between the rubber phase and the styrene-type polymer phase in the composition after compounding is advantageously improved. For this reason, the impact resistance of the styrene-type polymers is extremely improved by the compounding of the graft-modified ethylene-alpha-olefin copolymers. Contrary to this, according to the above-mentioned conventional methods for producing impact resistant styrene-type polymers, styrene-type monomers are polymerized in the presence of rubber-like elastomers to simultaneously effect two different reactions of the graft reaction of the monomers to the elastomers and the homopolymerization of the monomers. Accordingly, these conventional methods have disadvantages in that the reaction operation such as two-step polymerization is complicated and troublesome and also that the control of the reaction conditions is generally difficult. Contrary to this, according to the present invention, the impact resistance of the styrene-type polymers is advantageously improved, without decreasing the weathering resistance, molding properties, and surface hardness, by a simple operation of the addition of the graft-modified ethylene-alpha-olefin copolymers to the styrene-type polymers.

The weathering resistance and molding properties of the resultant impact resistant styrene-type polymer compositions according to the present invention are excellent as compared with those obtained from the conventional methods. Furthermore, the tensile strength of the resultant styrene-type polymer compositions according to the present invention is remarkably increased as compared with the original styrene-type polymers containing no graft-modified copolymers.

The present invention now will be further illustrated by, but is by no means limited to, the following examples.

PREPARATION EXAMPLE 1

Preparation of modified ethylene-propylene copolymer rubber grafted with styrene by an extrusion method A 100 parts by weight amount of low crystalline ethylene-propylene copolymer rubber pellets having an ethylene content of 80 mole%, an MFR of 9.2 g/10 min at a temperature of 230° C. under a load of 2160 g, a density of 0.87 g/cm$^3$, and a crystallinity index of 18%, 10 parts by weight of styrene, and 0.2 parts by weight of 2,5-dimethyl-2,5-di(tert-butylperoxy)hexyne-3 were thoroughly mixed in a Henschel mixer to impregnate the styrene and the above-mentioned peroxy compound into the ethylene-propylene copolymer rubber. Then, the mixture was fed to a 15 mm$\phi$ extruder having a setting temperature of 200° C. and was extruded at a residence time of 2.3 minutes while kneading. Thus, styrene graft-modified ethylene-propylene copolymer rubber was obtained in a whitish translucent solid. The styrene graft ratio was 1.9 parts by weight of styrene based on 100 parts by weight of the ethylene-propylene copolymer, measured by H-NMR spectroscopy. The MFR of the styrene graft-modified ethylene-propylene copolymer rubber was 0.4 g/10 min at a temperature of 230° C. under a load of 2160 g according to an ASTM-D-1238E method.

PREPARATION EXAMPLE 2

Preparation of modified ethylene-propylene copolymer rubber grafted with styrene by a solution method A 100 g amount of the low crystalline ethylene-propylene copolymer rubber used in Preparation Example 1 and 455 ml of p-xylene were charged into a glass reactor. The copolymer rubber was dissolved in p-xylene at a temperature of 125° C. Then, a solution of 10 g of styrene monomer diluted with 15 ml of p-xylene ("A" solution) and a solution of 0.675 g of dicumyl peroxide dissolved in 30 ml of p-xylene ("B" solution) were simultaneously and continuously dropwise added to the glass reactor from glass dropping funnels for 4 hours. The reaction was further continued for 2 hours. Thereafter, the resultant polymer solution in p-xylene was allowed to cool to room temperature.

The polymer solution was added to a large excess amount of methyl ethyl ketone to precipitate the polymer. The polymer was dissolved in p-xylene at a temperature of 125° C. After cooling, the solution was again added to a large excess amount of methyl ethyl ketone to remove the by-product homopolystyrene from the polymer product. Thus, the desired styrene graft-modified ethylene-propylene copolymer rubber was obtained. The styrene graft ratio was 1.7 parts by weight of styrene based on 100 parts by weight of the ethylene-propylene copolymer. The MFR of the graft-modified copolymer rubber was 6.9 g/10 min at a temperature of 230° C. under a load of 2160 g.

EXAMPLES 1 TO 12 AND COMPARATIVE EXAMPLES 1 TO 8

The impact resistance improvement effect of graft-modified ethylene-alpha-olefin copolymers on styrene-type polymers was evaluated as follows.

Styrene-type polymer compositions were prepared by dry blending GP-polystyrene TOPOREX GP-500-51 (Trademark, manufactured by Mitsui Toatsu Chemicals, Inc.) with various styrene graft-modified ethylene-propylene copolymers listed in Table 1, prepared in the same manner as described in Preparation Example 1 or 2 in a blender.

The dry blend compositions thus obtained were fed to a 15 mm$\phi$ extruder having a L/D ratio of 28 (a screw provided with a Dulmage head, screen: 60#/120#/60# mesh) at a temperature of 200° C. and was kneaded at 60 rpm. Thus, the compositions were pelletized. The pelletized samples were press molded in a compression molding press to form press sheets having a thickness of 3.0 mm or 1.0 mm. The specimens were prepared from the press sheets thus obtained. The evaluation of the properties of each specimen were carried out as follows:

Izod impact strength:

Izod impact strength of the specimen was determined by using the specimen having a thickness of 3.0 mm (two sheets being superposed) according to an ASTM-D-256 method (without a notch).

Tensile strength:

Tensile strength was determined at 50 mm/min by using an ASTM type IV dumbbell specimen in a Instron tensile strength tester.

Moldability:

MFR was determined at a temperature of 190° C. under a load of 2160 g according to an ASTM-D-1238E method.

The test results are shown in Table 1.

TABLE 1

| | Impact resistance modifier Styrene graft-modified ethylene-α-olefin copolymer rubber | | | | | | | | | |
|---|---|---|---|---|---|---|---|---|---|---|
| | Starting ethylene copolymer | | | | | | | Graft-modified product | | |
| No. | Ethylene content (mole %) | Comonomer (1) Kind | Content (mole %) | Comonomer (2) Kind | Content (mole %) | Density (g/cm$^3$) | Crystallinity index (%) | MFR$^{230° C.}$ (g/10 min) | Kind of graft monomer | Graft ratio*[1] (parts) | MFR$^{230° C.}$ (g/10 min) |
| Example | | | | | | | | | | | |
| 1 | 80 | Propylene | 20 | None | — | 0.87 | 18 | 1.2 | Styrene | 1.9 | 0.4 |
| 2 | 80 | " | 20 | " | — | 0.87 | 18 | 9.2 | " | 1.7 | 6.9 |
| 3 | 60 | " | 40 | " | — | 0.86 | 0 | 2.0 | " | 1.4 | 0.4 |
| 4 | 80 | " | 20 | " | — | 0.87 | 18 | 9.2 | " | 13.6 | 1.2 |
| 5 | 90 | Butene-1 | 10 | " | — | 0.88 | 40 | 4.0 | " | 1.5 | 0.6 |
| 6 | 80 | Propylene | 20 | " | — | 0.87 | 18 | 1.2 | p-Methyl-styrene | 2.0*[3] | 0.8 |

TABLE 1-continued

| No. | | | | | | | | | | | |
|---|---|---|---|---|---|---|---|---|---|---|---|
| 7 | 66 | " | 32 | 5-Ethylidene-2-norbornene | 2 | 0.87 | 10 | 0.6 | Styrene | 3.5 | 0.1 |
| 8 | 90 | Butene-1 | 9 | 5-Ethylidene-2-norbornene | 1 | 0.88 | 40 | 2.1 | " | 3.0 | 0.7 |
| 9 | 90 | Decene-1 | 10 | None | — | 0.88 | 40 | 3.5 | " | 1.9 | 1.0 |
| 10 | 92 | 4-Methylpentene-1 | 8 | " | — | 0.89 | 40 | 4.5 | " | 1.7 | 1.2 |
| 11 | 90 | Butene-1 | 10 | " | — | 0.88 | 40 | 4.0 | p-Methylstyrene | 1.9 | 1.0 |
| 12 | 80 | Propylene | 20 | " | — | 0.87 | 18 | 1.2 | p-t-Butylstyrene | 3.4 | 0.6 |
| Comparative Example | | | | | | | | | | | |
| 1 | — | — | — | None | — | — | — | — | — | No addition | (Blank) |
| 2 | 80 | Propylene | 20 | " | — | 0.87 | 18 | 0.7 | — | 0 | 0.7 |
| 3 | " | " | 20 | " | — | 0.87 | 18 | 2.0 | Styrene | 0.2 | 1.8 |
| 4 | " | " | 20 | " | — | 0.87 | 18 | 2.0 | " | 54.1 | 0.4 |
| 5 | 95 | " | 5 | " | — | 0.915 | 60 | 10.0 | " | 1.4 | 0.4 |
| 6 | 30 | " | 70 | " | — | 0.88 | 15 | 7.0 | " | 1.9 | 0.9 |
| 7 | 80 | " | 20 | " | — | 0.87 | 18 | 0.08 | " | 1.9 | 0.01 |
| 8 | 92 | " | 8 | " | — | 0.89 | 50 | 85 | " | 2.0 | 55 |

| | Blend | | | |
|---|---|---|---|---|
| | | Evaluation of properties | | |
| No. | Blend ratio Polystyrene modified rubber (wt. ratio) | Izod impact strength (without notch) (kg-cm/cm$^2$) | Tensile strength (kg/cm$^2$) | MFR$^{190°C}$ (g/10 min) |
| Example | | | | |
| 1 | 100/5.3 | 7.3 | 320 | 3.8 |
| 2 | " | 6.0 | 330 | 3.9 |
| 3 | " | 6.7 | 320 | 3.8 |
| 4 | " | 6.0 | 300 | 3.8 |
| 5 | " | 6.1 | 310 | 3.9 |
| 6 | " | 6.2 | 310 | 3.9 |
| 7 | " | 7.0 | 330 | 3.7 |
| 8 | " | 7.3 | 340 | 3.9 |
| 9 | " | 6.2 | 300 | 3.8 |
| 10 | " | 6.0 | 300 | 3.9 |
| 11 | " | 6.6 | 310 | 3.8 |
| 12 | " | 7.2 | 330 | 3.8 |
| Comparative Example | | | | |
| 1 | 100/0 | 4.4 | 250 | 4.3 |
| 2 | 100/5.3 | 4.6 | 270 | 3.4 |
| 3 | " | 4.0 | 240 | 3.3 |
| 4 | " | 3.9 | 220 | 3.6 |
| 5 | " | 3.8 | 210 | 3.5 |
| 6 | " | 3.7 | 220 | 3.3 |
| 7 | " | 3.8 | 250 | 3.0 |
| 8 | " | 4.6 | 220 | 4.4 |

*[1]Amount (parts by weight) of styrene-type hydrocarbon grafted onto 100 parts by weight of base polymer
*[2]GP—polystyrene TOPOREX GP-500-51 manufactured by Mitsui Chemicals Inc.
*[3]p-Methylstyrene is grafted

EXAMPLES 13 AND 14 AND COMPARATIVE EXAMPLES 9 AND 10

Styrene-type polymer compositions were prepared by dry blending HI-polystyrene Denka Styrol HI-S-2-301 (Trademark, manufactured by Denki Kagaku Kogyo K.K.) with various graft-modified ethylene-propylene copolymers listed in Table 2 prepared in the same manner as described in Preparation Example 1 or 2 in a blender.

The properties of these compositions were evaluated in the same manner as described above. The results are shown in Table 2.

COMPARATIVE EXAMPLE 11

A styrene-type polymer composition was prepared in the same manner as described in Example 13, except that hydrogenated SBS block copolymer KRATON G 1657 (Trademark manufactured by Shell Chemical Co., Ltd.) was used as a compounding agent.

The properties of this composition were evaluated in the same manner as described above. The results are shown in Table 2.

TABLE 2

| No. | Impact resistance modifier Styrene graft-modified ethylene-propylene copolymer rubber*1 | | Blend | Evaluation of properties | |
|---|---|---|---|---|---|
| | Styrene graft ratio*2 (parts) | MFR$^{230°\,C.}$ (g/10 min) | HI-polystyrene/*3 modified rubber (wt. ratio) | Izod impact strength (kg-cm/cm$^2$) | MFR$^{190°\,C.}$ (g/10 min) |
| Example | | | | | |
| 13 | 1.9 | 0.4 | 100/5.3 | 47.7 | 0.9 |
| 14 | 1.4 | 1.0 | " | 40.0 | 0.9 |
| Comparative Example | | | | | |
| 9 | No addition (blank) | | 100/0 | 33.5 | 1.1 |
| 10 | 0 | 0.7 | 100/5.3 | 29.7 | 1.0 |
| 11 | 15.5 | 6.4*4 | " | 29.9 | 1.0 |

*1Starting ethylene-propylene copolymer rubber (ethylene content 80 mole %, density 0.88 g/cm$^3$, crystallinity 18%)
*2See *1 of Table 1
*3Hi-impact polystyrene Denka Styrol HI-S-2-301 manufactured by Denki Kagaku Kogyo K.K.
*4Hydrogenated SBS block copolymer KRATON G 1657 manufactured by Shell Chemical Co., Ltd.

We claim:

1. A graft-modified copolymer having a melt flow rate of 0.01 to 100 g/10 min at a temperature of 230° C. under a load of 2160 g, said graft-modified copolymer being prepared by grafting (a) 100 parts by weight of low crystalline or amorphous ethylene-alpha-olefin copolymer having an ethylene content of 40 to 93 mole%, a melt flow rate of 0.1 to 50 g/10 min at a temperature of 230° C. under a load of 2160 g, a density of 0.90 g/cm$^3$ or less and having a crystallinity index of 0% to 50% with (b) 0.3 to 50 parts by weight of a styrene-type hydrocarbon.

2. A graft-modified copolymer as claimed in claim 1, wherein said ethylene-alpha-olefin copolymer further contains a diene monomer.

3. A compounding agent for a styrene-type polymer comprising a graft-modified copolymer having a melt flow rate of 0.01 to 100 g/10 min at a temperature of 230° C. under a load of 2160 g, said graft-modified copolymer being prepared by grafting (a) 100 parts by weight of low crystalline or amorphous ethylene-alpha-olefin copolymer having an ethylene content of 40 to 93 mole%, a melt flow rate of 0.1 to 50 g/10 min at a temperature of 230° C. under a load of 2160 g, a density of 0.90 g/cm$^3$ or less and having a crystallinity index of 0% to 50% with (b) 0.3 to 50 parts by weight of a styrene-type hydrocarbon.

4. A compounding agent as claimed in claim 3, wherein said ethylene-alpha-olefin copolymer further contains a diene monomer.

5. A process for producing a graft-modified copolymer having a melt flow rate of 0.01 to 100 g/10 min at a temperature of 230° C. under a load of 2160 g, comprising the step of graft copolymerizing (a) 100 parts by weight of low crystalline or amorphous ethylene-alpha-olefin copolymer having an ethylene content of 40 to 93 mole%, a melt flow rate of 0.1 to 50 g/10 min at a temperature of 230° C. under a load of 2160 g, a density of 0.90 g/cm$^3$ or less and having a crystallinity index of 0% to 50% with (b) 0.3 to 50 parts by weight of a styrene-type hydrocarbon.

6. A process as claimed in claim 5, wherein said graft copolymerization is carried out in a molten state in the presence of a radical initiator.

* * * * *